Patented June 13, 1939

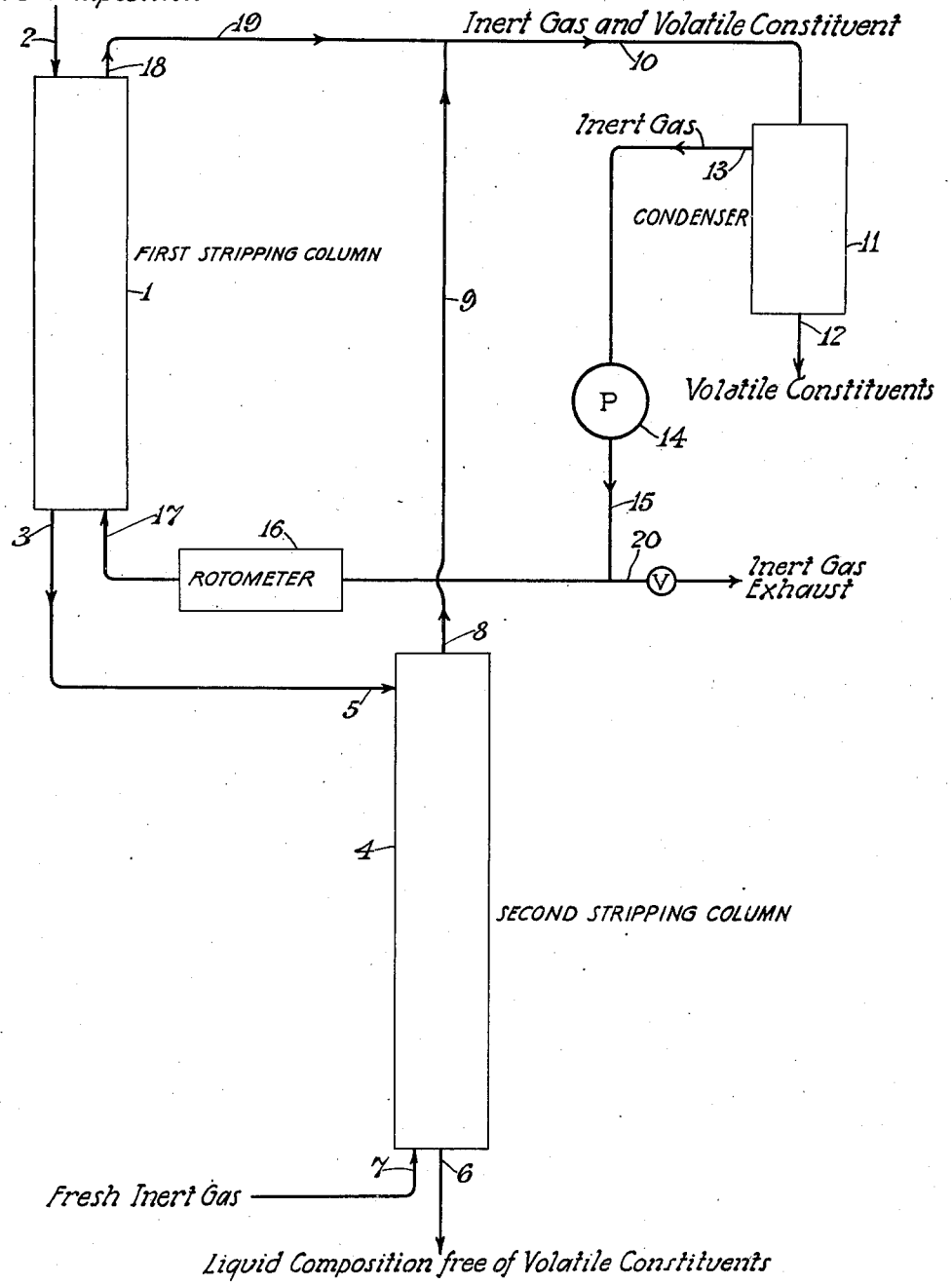

2,161,798

UNITED STATES PATENT OFFICE 2,161,798

CHEMICAL PROCESS

Albert S. Carter, Wilmington, Del., assignor to E. I. du Pont de Nemours & Company, Wilmington, Del., a corporation of Delaware Application October 15, 1937, Serial No. 169,170

3 Claims. (Cl. 202—46)

This invention relates to the removal of volatile constituents from liquid compositions comprising polymerizable derivatives of acetylene by passing an inert gas through said liquid composition to entrain the volatile constituents.

The polymerization of acetylene to nonbenzenoid polymers thereof may be carried out in successive steps. The first formed polymers further polymerize to produce polymers of greater molecular weight. As this polymerization proceeds, the nature of the polymers change from gaseous materials to liquids of high fluidity, to oily liquids, to gummy materials and finally to hard insoluble solids. It is often desirable to stop polymerization at an intermediate stage and thereby produce intermediate polymers having valuable chemical and commercial properties. When polymerization is thus interrupted, a mixture of materials is obtained. Attempts to separate such mixtures by distillation have been made. Separation by distillation has been successful but is invariably accompanied by a considerable loss of product due to further polymerization. Moreover, difficulties are experienced in carrying out continuous processes. More particularly, where one of the products is an oily liquid and where it is desired to remove from this oily liquid the more volatile less polymerizable materials by distillation, the oily polymers further polymerize producing gummy and hard substances which clog the apparatus. This necessitates frequent shutdowns for the purpose of difficult and costly cleaning of apparatus. The disadvantages herein described are also met with in separating vinylacetylene from less volatile, heat polymerizable divinylacetylene. "Volatile constituents" as used in this specification and the claims means constituents having lower boiling points than the heat polymerizable material in the liquid composition, said constituents also having an appreciable vapor pressure below the temperature at which heat polymerization of the polymerizable material takes place in substantial amount.

It is an object of this invention to remove volatile constituents from compositions containing polymerizable acetylene derivatives with minimum loss of said derivatives. A further object is the removal of divinylacetylene from an oily acetone-soluble polymer of divinylacetylene with a minimum further polymerization of said polymer.

These objects have been accomplished by passing an inert gas in contact with the liquid composition in such manner that the said gas entrains and removes volatile constituents therefrom.

The accompanying drawing is a flow sheet of the disclosed process.

While the volatile constituents may be removed in a single stripping chamber by entrainment with an inert gas, it has been found advantageous to use two or more separate stripping columns as is illustrated in the drawing and more fully described below, in order to obtain the best results. The liquid composition containing the undesirable volatile constituents enters the top of the first stripping column 1 at 2 and passes downward through the column, leaving the bottom of it at 3. From thence it passes into the top of the second stripping column 4 at 5, passes downward through said column and is drawn off from the bottom at 6. Inert gas is introduced at the bottom of the second column 4 at 7, passes upward entraining the volatile constituents and is vented from the top of the column at 8. The mixture of gases flows through conduits 9 and 10 to condenser 11 where the volatile constituents are liquified and drawn off at 12. The inert gas leaves condenser 11 at 13 and passes through pump 14, conduit 15, rotometer 16 and into the bottom of the first stripping column 1 at 17. The inert gas passes upward through column 1 entraining the volatile constituents and is vented from the top at 18 whence it passes through conduit 19, mingles with the vent gas from column 4 in conduit 10 and passes to condenser 11 for separation and recirculation. The flow of inert gas through column 1 is maintained substantially constant with the aid of rotometer 16. Part of the inert gas from condenser 11, equal in amount to that introduced at 7 is tapped off at 20 and discharged. By operating in this manner, the liquid composition is contacted in the first stripping column by recirculated inert gas which removes most of the volatile constituents. The liquid composition is then contacted in the second stripping column by inert gas of high purity and leaves said column substantially free of volatile constituents. During this process, suitable temperature controls maintain the liquid composition at a temperature below that at which the heat polymerizable material is polymerized in substantial amount. It is to be understood that the drawing is a mere diagrammatical flow sheet. The drawing is not to scale and no attempt has been made to show details which are unnecessary to an understanding of the process.

By way of specific example, one installation for the removal of divinylacetylene from a liquid composition comprising divinylacetylene and an oily acetone soluble polymer of divinylacetylene will be described. In this embodiment the first stripping column is 20 feet high, has a diameter of 2 inches and is jacketed over its entire length with a water jacket fed from a 65° C. thermostatically controlled supply. The column is not packed but contains a close fitting spiral made of 8 gage (0.065 inch) 18-8 wire to distribute the liquids uniformly over the walls of the column. The column is equipped with suitable inlets and outlets as shown in the flow sheet. The second column is identical with the first one except in size. It is 12 feet high and 7/8 inch in diameter and the wire spiral is constructed of 10 gage (0.049 inch) stainless steel wire. The condenser, pump and rotometer are all of conventional type and the apparatus is connected by suitable conduits as shown in the flow sheet. Approximately 28 pounds per hour of a crude liquid composition is introduced into the top of column 1 and 2. This liquid has a composition of about 5% xylene, 10 to 15% of oily acetone-soluble divinylacetylene polymers and 80 to 85% of unpolymerized divinylacetylene. With the jacket temperature held at 65° C. the temperatures in the column vary from 45° C. at the top to 55° C. in the middle and about 25° C. at the bottom, this variation being due to the chilling effect of the cold gas and the vaporization of the volatile constituents. Nitrogen is circulated around the cycle including stripping column 1, condenser 11, pump 14 and rotometer 16 at the rate of 765 cu. ft. per hour. Pure nitrogen is introduced into the bottom of the second stripping column at a rate of about 55 cu. ft. per hour and the average temperage of this column is about 45° C. The liquid discharged from the bottom of the second stripping column consists of approximately 3 to 4 lbs. per hour of polymers which contain less than 0.5% of divinylacetylene, xylene and other volatile constituents. The effluent gases from the first and second stripping columns are combined and enter condenser 11 where the entrained vapors are condensed out of the circulating nitrogen stream. When the stripping apparatus is operated in connection with an apparatus for polymerizing divinylacetylene, the condensate from condenser 11 is returned with fresh divinylacetylene to the polymerizer for further conversion to the oily relatively non-volatile polymers.

Numerous variations are possible in the arrangement and nature of the apparatus used for carrying out the process of this invention. Any apparatus which produces efficient contact between the inert gas and the liquid composition from which volatile constituents are to be removed may be used. For example, instead of the column described, columns may be used which are packed with copper or glass rings, carborundum, chain or other materials suitable for packed columns. Plain columns may also be used. Various gas distributors may advantageously be used in the stripping column or chamber. One stripping column may be used or two or more stripping columns may be employed in parallel, in series or some in parallel with some in series. Pumps, valves, flow meter, temperature and pressure control apparatus may be placed wherever necessary.

The liquid composition preferably flows through the columns at a rate which produces a thin layer of liquid on the walls of the column or on the packing, thus presenting a large surface area of liquid per unit volume in contact with the stripping gas. Flooded columns may be used although such conditions are, in general, less efficient.

Any fluid which is in the non-liquid state at the temperature and pressure used in the stripping operation, and which is inert to the constituents of the liquid composition being treated, may be used in the stripping operation and the term "inert gas" is used to signify such a non-liquid fluid. Those inert gases are preferred which satisfy these conditions at a preferred temperature (between 20° and 45° C.) and atmospheric pressure. By way of example, the following gases have been found to be satisfactory in the process of the specific example: nitrogen, hydrogen, carbon dioxide and the inert gases of the zero group of the periodic table.

The process may be operated at any convenient pressure. The use of vacuum assists the process in some respects but the disadvantages generally outweigh the advantages. In general, it is most convenient to carry out the stripping at or slightly above atmospheric pressure. The temperature of the stripping operation may be controlled within suitable limits. Since it is an object of this invention to prevent further polymerization by heat, it is desirable to keep the temperature as low as possible, consistent with efficient stripping. It has been found that stripping can be efficiently accomplished at between 20° and 45° C. at atmospheric pressure in the case of the specific example. In no event should the temperature be high enough to produce polymerization of the heat polymerizable material in substantial amount (1.5%).

I claim:

1. A process for removing divinylacetylene from a liquid composition which comprises an oily acetone-soluble polymer of divinylacetylene, which process comprises bringing an inert gas into contact with said liquid composition, entraining divinylacetylene with said inert gas and separating the gases from the liquid while maintaining the temperature at between 20° and 45° C. which is below that at which said polymer of divinylacetylene is heat polymerized in substantial amount.

2. A process for removing divinylacetylene from a liquid composition which comprises an oily acetone-soluble polymer of divinylacetylene, which process comprises passing said liquid composition through a stripping zone and simultaneously passing an inert gas in counter-current contact with said liquid in the stripping zone while maintaining the zone at a temperature between 20° and 45° C. which is below that at which said polymer is polymerized in substantial amount.

3. A process for removing divinylacetylene from a liquid composition which comprises an oily acetone-soluble polymer of divinylacetylene, which process comprises passing said liquid composition downward through a first stripping zone, circulating an inert gas upward through said first stripping zone, then through a condenser to remove volatile constituents entrained in said stripping zone and then back through said stripping zone, passing said liquid composition from the bottom of the first stripping zone to the top of a second stripping zone and downward through said second zone, passing inert gas of high purity into the bottom of the second stripping zone, venting said gas and entrained volatile constituents from the top of said second stripping zone, mingling said vent gases with the vent gases of the first stripping zone at a point prior to the passage of said gases through the said condenser and removing a portion of the inert gas from the system at a point between that at which it leaves the condenser and that at which it enters the first stripping zone, the temperature in the stripping zones being maintained between 20° and 45° C.

ALBERT S. CARTER.